US008185813B2

(12) United States Patent
Graham

(10) Patent No.: US 8,185,813 B2
(45) Date of Patent: May 22, 2012

(54) 2D GRAPH DISPLAYING DOCUMENT LOCATIONS OF USER-SPECIFIED CONCEPT OF INTEREST

(75) Inventor: Jamey Graham, San Jose, CA (US)

(73) Assignee: Ricoh Company, Ltd., Tokyo (JP)

(*) Notice: Subject to any disclaimer, the term of this patent is extended or adjusted under 35 U.S.C. 154(b) by 1284 days.

(21) Appl. No.: 11/613,846

(22) Filed: Dec. 20, 2006

(65) Prior Publication Data

US 2007/0180372 A1    Aug. 2, 2007

Related U.S. Application Data

(63) Continuation of application No. 09/348,652, filed on Jul. 6, 1999, now Pat. No. 7,228,492.

(51) Int. Cl.
*G06F 17/00* (2006.01)
(52) U.S. Cl. ........................................ 715/200; 715/255
(58) Field of Classification Search .................. 715/200, 715/255, 209; 707/3
See application file for complete search history.

(56) References Cited

U.S. PATENT DOCUMENTS

| | | | |
|---|---|---|---|
| 4,417,239 A | 11/1983 | Demke et al. | |
| 4,823,303 A | 4/1989 | Terasawa | |
| 5,153,831 A | 10/1992 | Yianilos | |
| 5,297,042 A | 3/1994 | Morita | |
| 5,299,123 A | 3/1994 | Wang et al. | |
| 5,309,359 A | 5/1994 | Katz et al. | |
| 5,339,391 A | 8/1994 | Wroblewski et al. | |
| 5,349,658 A | 9/1994 | O'Rourke et al. | |
| 5,384,703 A | 1/1995 | Withgott et al. | |
| 5,404,295 A | 4/1995 | Katz et al. | |
| 5,418,948 A | 5/1995 | Turtle | |
| 5,442,795 A | 8/1995 | Levine et al. | |
| 5,446,891 A | 8/1995 | Kaplan et al. | |
| 5,479,600 A | 12/1995 | Wroblewski et al. | |
| 5,481,666 A | 1/1996 | Nguyen et al. | |
| 5,519,857 A | 5/1996 | Kato et al. | |
| 5,523,945 A | 6/1996 | Satoh et al. | |
| 5,530,942 A | 6/1996 | Tzou et al. | |
| 5,533,182 A | 7/1996 | Bates et al. | |
| 5,535,382 A * | 7/1996 | Ogawa .............................. 707/5 |

(Continued)

FOREIGN PATENT DOCUMENTS

DE    198 59 180 A1    12/1998

(Continued)

OTHER PUBLICATIONS

Communication mailed Jul. 24, 2007 from the Japanese Patent Office in Japanese Application 2000-012042.

(Continued)

*Primary Examiner* — Manglesh M Patel
(74) *Attorney, Agent, or Firm* — Kilpatrick Townsend & Stockton LLP

(57) ABSTRACT

According to one embodiment of the present invention, methods and systems for displaying an interest profile for an electronically stored document are provided. Interest profiles provide features that can enhance the experience of reading or using the electronic document. In exemplary embodiments, methods and systems include one or more interest profile techniques, such as graphical presentations and the like, for browsing or searching documents are provided. The graphical presentation can provide information about content of a document. The invention can be embodied in computer systems that include user input devices, processors, displays, storage and the like.

12 Claims, 10 Drawing Sheets
(7 of 10 Drawing Sheet(s) Filed in Color)

U.S. PATENT DOCUMENTS

| | | | |
|---|---|---|---|
| 5,546,502 A | 8/1996 | Hart et al. | |
| 5,596,700 A | 1/1997 | Darnell et al. | |
| 5,598,557 A | 1/1997 | Doner et al. | |
| 5,638,543 A | 6/1997 | Pedersen et al. | |
| 5,680,636 A | 10/1997 | Levine et al. | |
| 5,694,559 A | 12/1997 | Hobson et al. | |
| 5,696,963 A * | 12/1997 | Ahn ..................................... | 1/1 |
| 5,721,897 A * | 2/1998 | Rubinstein ............................ | 1/1 |
| 5,721,902 A | 2/1998 | Schultz | |
| 5,737,599 A | 4/1998 | Rowe et al. | |
| 5,748,805 A | 5/1998 | Withgott et al. | |
| 5,751,283 A | 5/1998 | Smith | |
| 5,751,287 A | 5/1998 | Hahn et al. | |
| 5,754,939 A | 5/1998 | Herz et al. | |
| D395,297 S | 6/1998 | Cheng et al. | |
| 5,761,655 A | 6/1998 | Hoffman | |
| 5,768,578 A | 6/1998 | Kirk et al. | |
| 5,774,118 A | 6/1998 | Hatakama | |
| 5,774,888 A | 6/1998 | Light | |
| 5,778,363 A | 7/1998 | Light | |
| 5,778,397 A | 7/1998 | Kupiec et al. | |
| 5,781,785 A | 7/1998 | Rowe et al. | |
| 5,784,616 A | 7/1998 | Horvitz | |
| D398,299 S | 9/1998 | Ballay et al. | |
| 5,806,079 A | 9/1998 | Rivette et al. | |
| D400,195 S | 10/1998 | Utesch | |
| 5,818,446 A | 10/1998 | Bertram et al. | |
| 5,819,301 A | 10/1998 | Rowe et al. | |
| D400,520 S | 11/1998 | Baker et al. | |
| 5,832,474 A | 11/1998 | Lopresti et al. | |
| 5,835,922 A | 11/1998 | Shima et al. | |
| 5,838,317 A | 11/1998 | Bolnick et al. | |
| 5,838,323 A | 11/1998 | Rose et al. | |
| 5,845,305 A | 12/1998 | Kujiraoka | |
| 5,847,709 A | 12/1998 | Card et al. | |
| 5,857,185 A | 1/1999 | Yamaura | |
| 5,860,074 A | 1/1999 | Rowe et al. | |
| 5,870,770 A | 2/1999 | Wolfe | |
| 5,873,107 A | 2/1999 | Borovoy et al. | |
| 5,920,859 A * | 7/1999 | Li .......................................... | 1/1 |
| 5,926,808 A * | 7/1999 | Evans et al. ............................ | 1/1 |
| 5,933,841 A | 8/1999 | Schumacher et al. | |
| 5,943,669 A | 8/1999 | Numata | |
| 5,943,679 A | 8/1999 | Niles et al. | |
| 5,946,678 A * | 8/1999 | Aalbersberg .......................... | 1/1 |
| 5,950,187 A | 9/1999 | Tsuda | |
| 5,963,940 A | 10/1999 | Liddy et al. | |
| 5,987,454 A | 11/1999 | Hobbs | |
| 5,987,460 A | 11/1999 | Niwa et al. | |
| 5,991,783 A | 11/1999 | Popa et al. | |
| 6,006,218 A | 12/1999 | Breese et al. | |
| 6,006,225 A * | 12/1999 | Bowman et al. ...................... | 1/1 |
| D418,826 S | 1/2000 | Pavely et al. | |
| D419,144 S | 1/2000 | Baker et al. | |
| 6,012,053 A | 1/2000 | Pant et al. | |
| 6,021,403 A | 2/2000 | Horvitz et al. | |
| 6,026,409 A | 2/2000 | Blumenthal | |
| 6,026,416 A | 2/2000 | Kanerva et al. | |
| 6,028,601 A | 2/2000 | Machiraju et al. | |
| 6,041,323 A * | 3/2000 | Kubota ................................. | 1/1 |
| 6,055,542 A | 4/2000 | Nielsen et al. | |
| D424,036 S | 5/2000 | Arora et al. | |
| D425,039 S | 5/2000 | Shields | |
| D425,497 S | 5/2000 | Eisenberg et al. | |
| 6,057,839 A | 5/2000 | Advani et al. | |
| 6,070,176 A | 5/2000 | Downs et al. | |
| 6,076,088 A | 6/2000 | Paik et al. | |
| 6,085,202 A | 7/2000 | Rao et al. | |
| 6,094,648 A | 7/2000 | Aalbersberg et al. | |
| 6,101,503 A | 8/2000 | Cooper et al. | |
| 6,122,647 A | 9/2000 | Horowitz et al. | |
| 6,131,092 A | 10/2000 | Masand | |
| D435,561 S | 12/2000 | Pettigrew et al. | |
| 6,167,368 A | 12/2000 | Wacholder | |
| 6,182,067 B1 | 1/2001 | Presnell et al. | |
| 6,182,090 B1 | 1/2001 | Peairs | |
| D439,585 S | 3/2001 | Law et al. | |
| 6,205,456 B1 | 3/2001 | Nakao | |
| 6,222,547 B1 | 4/2001 | Schwuttke et al. | |
| 6,236,768 B1 | 5/2001 | Rhodes et al. | |
| D445,802 S | 7/2001 | Greminger | |
| 6,259,458 B1 | 7/2001 | Theisen et al. | |
| 6,275,229 B1 | 8/2001 | Weiner et al. | |
| D449,050 S | 10/2001 | Graham | |
| 6,326,957 B1 | 12/2001 | Nathan et al. | |
| 6,335,730 B1 | 1/2002 | Gould | |
| 6,339,437 B1 | 1/2002 | Nielsen | |
| 6,369,811 B1 | 4/2002 | Graham et al. | |
| D456,817 S | 5/2002 | Graham | |
| 6,397,213 B1 * | 5/2002 | Cullen et al. ........................ | 707/5 |
| 6,457,026 B1 | 9/2002 | Graham et al. | |
| 6,470,307 B1 | 10/2002 | Turney | |
| 6,535,890 B2 | 3/2003 | Sandifer | |
| 6,553,373 B2 | 4/2003 | Boguraev et al. | |
| 6,564,250 B1 | 5/2003 | Nguyen | |
| 6,582,475 B2 | 6/2003 | Graham et al. | |
| 6,606,105 B1 | 8/2003 | Quartetti | |
| 6,654,738 B2 | 11/2003 | Nishioka et al. | |
| 6,681,370 B2 | 1/2004 | Gounares et al. | |
| 6,693,652 B1 | 2/2004 | Barrus et al. | |
| 6,792,430 B1 | 9/2004 | Kenyon et al. | |
| 6,839,702 B1 * | 1/2005 | Patel et al. ............................ | 1/1 |
| 6,964,025 B2 | 11/2005 | Angiulo et al. | |
| 6,968,332 B1 * | 11/2005 | Milic-Frayling et al. .............. | 1/1 |
| 7,096,424 B2 | 8/2006 | Graham et al. | |
| 7,228,492 B1 * | 6/2007 | Graham ........................ | 715/234 |
| 7,739,622 B2 | 6/2010 | DeLine et al. | |
| 2002/0042792 A1 | 4/2002 | Nishioka et al. | |
| 2002/0065814 A1 | 5/2002 | Okamoto et al. | |
| 2003/0051214 A1 | 3/2003 | Graham et al. | |
| 2004/0059708 A1 | 3/2004 | Dean et al. | |
| 2007/0016856 A1 | 1/2007 | Graham et al. | |

FOREIGN PATENT DOCUMENTS

| | | |
|---|---|---|
| EP | 378 848 A2 | 7/1990 |
| EP | 459 174 A2 | 12/1991 |
| EP | 737 927 A2 | 10/1996 |
| EP | 762 297 A2 | 3/1997 |
| EP | 802 492 A1 | 10/1997 |
| GB | 2137788 A | 10/1984 |
| GB | 2156118 A | 10/1985 |
| GB | 2234609 A | 2/1991 |
| GB | 2290898 A | 1/1996 |
| GB | 2 332 544 A | 6/1999 |
| JP | 02-001057 | 1/1990 |
| JP | 05-081327 | 4/1993 |
| JP | 05-081327 A | 4/1993 |
| JP | 06-203024 | 7/1994 |
| JP | 07-146872 | 6/1995 |
| JP | 08-255163 | 10/1996 |
| JP | 8-297677 A | 11/1996 |
| JP | 11-213011 | 8/1999 |
| WO | WO 97/12328 A1 | 4/1997 |

OTHER PUBLICATIONS

Pages 40-45 and 164 from *Internet Surfer*, 1997.2, document in Japanese with partial translation.

Communication mailed Aug. 21, 2007, received from the Japanese Patent Office in Japanese Application 2006-012042.

Communication mailed Aug. 14, 2007, received from the Japanese Patent Office in Japanese Application 11-195547.

Acrobat Reader Version 2.0 (software application), Adobe Systems Incorporated, screenshots Figures 1-10 (1994).

Adobe Acrobat Reader 3.0 screen dumps (1996).

Adobe Systems, Inc., "Adobe Photoshop 4.0 User Guide for Macintosh and Windows," Title Page, Copyright Page, Chap. 2, pp. 30-31 (1996).

Adobe Systems Incorporated, Acrobat Reader, 1999, Adobe Systems Incorporated, Version 4.0.

Amati et al., "A Framework for Filtering News and Managing Distributed Data," *J. Universal Comp. Sci.*, 3(8):1007-1021 (1997).

Apple computer, Inc., "Getting Help" and "Turning Balloon Help" Macintosh Data Book, Reference 7 System, in Chapter 1 entitled "A Review of Standard Macintosh Operations," pp. 30-31 (1991).

Photoshoot 4.0, pp. 30-31.

Balasubramanian, V., *State of the Art Review on Hypermedia Issues and Applications*, chapter 5—Information Retrieval Issues, E-Papyrus, Inc., Apr. 1998 (downloaded from website on Dec. 15, 2004) on the internet: <http://www.e-papyrus.com/hypertext_review/index.html>.

Ball et al., "Software Visualization in the Large," *IEEE Computer*, 29(4): 33-43, Apr. 1996. http://www.computer.org/computer/co1996/r4033abs.htm.

Begole et al., "Flexible Collaboration Transparency," doc. ID: ncstrl.vatech_cs/TR-98-11, Virginia Polytechnic Institute and State University (1998).

Begole et al., "Supporting Worker Independence in Collaboration Transparency," doc. ID: ncstrl.vatech_cs/TR-98-12, Virginia Polytechnic Institute and State University (1998).

Boguraev et al., *Salience-Based Content Characterisation of Text Documents*, In Proceedings of the ACL/EACL Workshop on Intellgent [Sic] Scalable Text Summarization, 1997. Topic identification, Discourse-based summarization. pp. 1-12.

Brandow et al., "Automatic Condensation of Electronic Publications by Sentence Selection," *Information Processing and Management*, 31(5):675-685 (1995).

Byrd, D., "A Scrollbar-based Visualization for Document Navigation," doc. ID: xxx.cs.IR/9902028, Computing Research Repository Information Retrieval (1999).

"Flexible JAMM Screenshots," downloaded from internet site http://simon.cs.ct.edu/-jamm May 4, 2000.

Gliedman, J., "Virtual Office Managers," *Computer Shopper*, 18(9):290 (1998).

Greenberg et al., (1995) *Sharing fisheye views in relaxed-WYSIWIS groupware applications*, Proceedings of Graphics Interface, Toronto, Canada, May 22-24, Distributed by Morgan-Kaufmann, pp. 28-38, http://www.cpsc.ucalgary.ca/grouplab/papers/1996/96-Fisheye.GI/gi96 fisheye.html.

Hart et al., "Query-Free Information Retrieval,", IEEE Cooperative Information Systems, pp. 32-37, Oct. 1997.

Hearst, M., *TileBars: Visualization of Term Distribution Information in Full Text Information Access*, Proceedings of the ACM SIGCHI Confernce on Human Factors in Computing Systems (CHI), Denver, CO., May 1995, pp. 1-8, http://www.acm.org/sigchi/chi95/Electronic/documents/papers/mah bdy htm.

Hill et al. "Edit Wear and Read Wear," Computer Graphics and Interactive Media Research Group, pp. 3-9, (May 1992).

IBM Technical Disclosure Bulletin, "Quick Selection of Window Environment Coordinates," 35:57-60, ISS # 4B, (1992).

Lam et al. "Automatic document classification based on probabilistic reasoning: model and performance analysis," *IEEE*, 3:2719-2723 (1997).

Langley, P., "An Analysis of Bayesian Classifiers," *Proceedings of 10th National Conference on Artifical Intelligence*, pp. 223-228 (1992).

Langley, P., "Induction of Selective Bayesian Classifiers," *Proceedings of 10th National Conference on Uncertainty in Artifical Intelligence*, pp. 400-406 (1994).

Manber, U., "The Use of Customized Emphasis in Text Visualization," *1997 IEEE Conf. on Info. Visualization*, London, England, pp. 132-138 (1997).

Schweighofer et al., "The automatic Generation of Hypertext Links in Legal Documents," from *Lecture Notes in Computer Science 1134*, 7th International Conference, DEXA '96, Zurich, Switzerland, pp. 889-898 (1996).

Shneiderman, B., "Dynamic Queries for Visual Information Seeking," pp. 236-243 from *Readings in Information Visualization, Using Vision to Think*, Card et al., Eds., Morgan Kaufman Publishers, Jan. 25, 1999.

Sumita et al., "Document Structure Extraction for Interactive Document Retrieval Systems," *Proceedings of SIGDOC '93*, Getting in Touch—Staying Touch, pp. 301-310 (1993).

Taghva et al., "An Evaluation of an Automatic Markup System," *SPIE*, 2422:317-327 (1995).

Taxt, T., "Segmentation of Document Images," *IEEE*, 11(12):1322-1329 (1989).

"c:\...\9149920c.wpd—unmodified" Screen Shots of document created in Corel WordPerfect, 4 pages, (Apr. 30, 2002).

IHTML TxtRange Interface, Web Workshop, printed on Feb. 5, 2004, 3 pages, at URL: http://web.archive.org/web/20000420123724/msdn.microsoft.com/workshop/browser/mshtml/ . . . .

Non-Final Office Action for U.S. Appl. No. 09/636,039, mailed on Feb. 12, 2004, 26 pages.

Final Office Action for U.S. Appl. No. 09/636,039, mailed on Sep. 17, 2004, 19 pages.

Non-Final Office Action for U.S. Appl. No. 09/636,039, mailed on Feb. 18, 2005, 20 pages.

Final Office Action for U.S. Appl. No. 09/636,039, mailed on Nov. 1, 2005, 26 pages.

Non-Final Office Action for U.S. Appl. No. 09/636,039, mailed on Jun. 15, 2006, 16 pages.

Final Office Action for U.S. Appl. No. 09/636,039, mailed on Dec. 15, 2006, 16 pages.

Non-Final Office Action for U.S. Appl. No. 09/636,039, mailed on Sep. 7, 2007, 16 pages.

U.S. Appl. No. 09/636,039, filed Aug. 9, 2000, Graham et al.

U.S. Appl. No. 08/995,616, filed Dec. 22, 1997, Graham et al.

Final Office Action for U.S. Appl. No. 09/636,039, mailed on Jul. 8, 2008, 23 pages.

Advisory Action for U.S. Appl. No. 09/636,039, mailed on Sep. 15, 2008, 3 pages.

Non-Final Office Action for U.S. Appl. No. 09/636,039, mailed on Dec. 9, 2008, 14 pages.

Non-Final Office Action for U.S. Appl. No. 09/661,184, mailed on Jan. 3, 2002. 25 pages.

Notice of Allowance for U.S. Appl. No. 09/661,184, mailed on May 6, 2002, 10 pages.

Non-Final Office Action for U.S. Appl. No. 10/214,380, mailed on Jun. 28, 2005, 19 pages.

Final Office Action for U.S. Appl. No. 10/214,380, mailed on Jan. 25, 2006, 20 pages.

Advisory Action for U.S. Appl. No. 10/214,380, mailed on May 30, 2006, 3 pages.

Non-Final Office Action for U.S. Appl. No. 10/214,380, mailed on Oct. 3, 2006, 11 pages.

Non-Final Office Action for U.S. Appl. No. 10/214,380, mailed on May 1, 2007, 19 pages.

Non-Final Office Action for U.S. Appl. No. 10/214,380, mailed on Jan. 9, 2008, 15 pages.

Notice of Allowance for U.S. Appl. No. 10/214,380, mailed on Apr. 2, 2008, 70 pages.

Non-Final Office Action for U.S. Appl. No. 09/149,920, mailed on May 12, 2000.

Final Office Action for U.S. Appl. No. 09/149,920, mailed on Jan. 31, 2001.

Non-Final Office Action for U.S. Appl. No. 09/149,920, mailed on Oct. 23, 2001.

Final Office Action for U.S. Appl. No. 09/149,920, mailed on May 8, 2002.

Advisory Action for U.S. Appl. No. 09/149,920, mailed on Sep. 10, 2002.

Notice of Allowance for U.S. Appl. No. 09/149,920, mailed on Dec. 31, 2002.

Non-Final Office Action for U.S. Appl. No. 10/402,844, mailed on Jul. 25, 2005, 18 pages.

Final Office Action for U.S. Appl. No. 10/402,844, mailed on Jan. 11, 2006, 10 pages.

Notice of Allowance for U.S. Appl. No. 10/405,844, mailed on Apr. 11, 2006, 9 pages.

Non-Final Office Action for U.S. Appl. No. 11/482,529, mailed on Jul. 21, 2009, 24 pages.

Non-Final Office Action for U.S. Appl. No. 09/149,921, mailed on Oct. 3, 2000, 9 pages.

Notice of Allowance for U.S. Appl. No. 09/149,921, mailed on Jan. 25, 2001, 8 pages.

Notice of Allowance for U.S. Appl. No. 09/149,921, mailed on Aug. 13, 2001, 5 pages.

Non-Final Office Action for U.S. Appl. No. 09/348,652, mailed on Oct. 23, 2002, 14 pages.

Final Office Action for U.S. Appl. No. 09/348,652, mailed on Jul. 28, 2003, 14 pages.

Advisory Action for U.S. Appl. No. 09/348,652, mailed on Nov. 19, 2003, 3 pages.

Non-Final Office Action for U.S. Appl. No. 09/348,652, mailed on Feb. 24, 2004, 15 pages.

Final Office Action for U.S. Appl. No. 09/348,652, mailed on Oct. 7, 2004, 19 pages.

Non-Final Office Action for U.S. Appl. No. 09/348,652, mailed on May 5, 2005, 18 pages.

Final Office Action for U.S. Appl. No. 09/348,652, mailed on Nov. 30, 2005, 17 pages.

Notice of Allowance for U.S. Appl. No. 09/348,652, mailed on Sep. 26, 2006, 10 pages.

Anick et al., "Exploiting Clustering and Phrases for Context-Based Information Retrieval," Special Interest Group on Information Retrieval 1997, Copyright 1997, pp. 314-323, ACM.

Boyle, "Metadoc: An Adaptive Hypertext Reading System," User Modeling and User-Adapted Interaction, Copyright 1994, pp. 1-19, Kluwer Academic Publishers, Netherlands.

Brusilovsky, "Methods and Techniques of Adaptive Hypermedia," User Modeling and User-Adapted Interaction, Copyright 1996, pp. 87-129, Kluwer Academic Publishers, Netherlands.

De Rosis, et al., "Modeling the User Knowledge by Belief Networks," User Modeling and User-Adapted Interaction 1992, Copyright 1992, pp. 367-388, Kluwer Academic Publishers, Netherlands.

Feldman, et al., "Pattern Based Browsing in Document Collections," Lecture Notes in Computer Science, Copyright 1997, pp. 112-122, vol. 1263.

Kaplan, et al., "Adaptive Hypertext Navigation Based on User Goals and Context," User Modeling and User-Adapted Interaction 1993, Copyright 1993, Copyright 1993, pp. 193-220, Netherlands.

Lieberman, "Letizia: An Agent That Assists Web Browsing," AAAI Technical Report FS-95-03 Compilation, Copyright 1995, pp. 97-102, AAAI.

Mathe et al., "User-Centered Indexing for Adaptive Information Access," User Modeling and User-Adapted Interaction 1996, Copyright 1996, pp. 225-261, Kluwer Academic Publishers, Netherlands.

Myaeng et al., "Towards an Intelligent and Personalized Retrieval System," Proceedings of the ACM SIGARTI International Symposium on Methodologies for Intelligent Systems, Copyright 1986, pp. 121-129.

Tong, et al., "Conceptual Information Retrieval using RUBRIC," Copyright 1987, pp. 247-253, ACM.

Torrance, "Active Notebook: A Personal and Group Productivity Tool for Managing Information," AAAI Technical Report FS-95-03 Compilation, Copyright 1995, pp. 131-135, AAAI.

Non-Final Office Action for U.S. Appl. No. 11/482,529, mailed on Jun. 30, 2010, 38 pages.

Non-Final Office Action for U.S. Appl. No. 11/482,529, mailed on Feb. 22, 2010, 24 pages.

Final Office Action for U.S. Appl. No. 11/841,989 mailed on Feb. 3, 2011, 15 pages.

Gelfand et al., "Automated Concept Extraction From Plain Text," AAAI Technical Report WS-98-05, Copyright 1998, pp. 13-17.

Sahami, "Learning for Text Categorization," Technical Report WS-98-05, printed on Nov. 3, 2010, at URL: http://www.aaai.org/Library/Workshops/ws98-05.php, 2 pages.

"Workshops at the Fifteenth National Conference on Artificial Intelligence," AAAI Sponsored Workshops—AAAI-98, printed on Nov. 3, 2010, at URL: http://www.aaai.org/Workshops/ws98.php, 3 pages.

Non-Final Office Action for U.S. Appl. No. 11/841,989, mailed on Sep. 14, 2010, 30 pages.

Final Office for U.S. Appl. No. 11/482,529, mailed on Nov. 8, 2010, 29 pages.

* cited by examiner

2D GRAPH DISPLAYING DOCUMENT LOCATIONS OF USER-SPECIFIED CONCEPT OF INTEREST

CROSS-REFERENCES TO RELATED APPLICATIONS

This application is a continuation of U.S. patent application Ser. No. 09/348,652, filed Jul. 6, 1999, now U.S. Pat. No. 7,228,492, issued Jun. 5, 2007, and incorporates by reference the following commonly owned co-pending U.S. Patent Application in its entirety for all purposes:

U.S. patent application Ser. No. 08/995,616, now abandoned.

BACKGROUND OF THE INVENTION

The present invention relates to electronic documents and more particularly to method and system for providing interest profiles for electronic documents with features to enhance the experience of reading or using the electronic document.

Increasingly, readers of documents are being called upon to assimilate vast quantities of information in a short period of time. To meet the demands placed upon them, readers find they must read documents "horizontally," rather than "vertically," i.e., they must scan, skim, and browse sections of interest in multiple documents rather than read and analyze a single document from beginning to end.

Documents are becoming more widely available in electronic form. Some documents are available electronically by virtue of their having been created using word processing software. Other electronic documents are accessible via the Internet. Yet others may become available in electronic form by virtue of being scanned in, copied, or faxed. Commonly assigned U.S. application Ser. No. 08/754,721, entitled AUTOMATIC AND TRANSPARENT DOCUMENT ARCHIVING, the contents of which are incorporated herein by reference for all purposes, details a system for generating electronic as well as hardcopy format of documents.

However, the mere availability of documents in electronic form does not assist the reader in confronting the challenges of assimilating information quickly.

Certain tools take advantage of the electronic form documents to assist harried readers. Tools exist to search for documents both on the Internet and locally. Once a document is identified and retrieved, automatic summarization techniques, such as the Reader's Helper™, described in a commonly owned copending U.S. patent application Ser. No. 08/995,616, entitled AUTOMATIC ADAPTIVE DOCUMENT HELP SYSTEM, the contents of which are incorporated herein by reference for all purposes, helps the reader to find as well as assimilate the information he or she wants more quickly.

What is needed is a document interest profiling method that helps the reader find the information he or she wants more quickly. The document interest profiling method should be easily personalized, flexible and adaptive as well.

SUMMARY OF THE INVENTION

According to one embodiment of the present invention, methods and systems for displaying an interest profile for an electronically stored document are provided. Interest profiles provide features that can enhance the experience of reading or using the electronic document. In exemplary embodiments, methods and systems include one or more interest profile techniques, such as graphical presentations and the like, for browsing or searching documents are provided. The graphical presentation can provide information about content of a document. The invention can be embodied in computer systems that include user input devices, processors, displays, storage and the like.

In an exemplary embodiment, a method for providing an interest profile includes a variety of steps. A step of accepting from a user input indicating the user's specified concepts of interest can be part of the method. The method can also include analyzing an electronically stored document to identify locations of discussion of the user-specified concept of interest. Techniques for determining locations of concepts of interest can be used with the method, such as keyword counting, Bayesian analysis techniques described in a commonly owned copending U.S. patent application Ser. No. 08/995,616, entitled AUTOMATIC ADAPTIVE DOCUMENT HELP SYSTEM, and the like, in various embodiments of the present invention. The method also displays an indication of presence of discussion about the concepts of interest within the electronically stored document. The indication can provide to a reader approximate positions of portions of the document relevant to the concept of interest.

In some embodiments, the indication can be a graphical representation of the presence of one or more concepts of interest to the reader. The graph can also indicate a persistence of the concept at various locations within the document by showing a relative amount of discussion of the concepts at various locations within the document. Embodiments can provide graphical presentations including contours, bar charts, scatter plots, and the like.

In another aspect according to the present invention, a method for providing an interest profile for an electronically stored document comprises a number of steps, such as accepting user input indicating user-specified concepts of interest and analyzing the electronically stored document to identify locations of discussion of the user-specified concepts of interest. The method can include displaying one or more selectable concept indicators corresponding to particular concepts of interest and accepting user input selecting at least one of these concept indicators. The method can also include displaying an indication of presence of discussion about one or more of the concepts of interest within the electronically stored document. The indication of presence can comprise a contour graph image corresponding to the electronically stored document that indicates a relative presence of discussions of at least one of the concepts of interest based upon the selections made by the user.

Some embodiments can also include displaying a second indication of presence of the concepts of interest comprising an elongated thumbnail image of all or a portion of electronically stored document in another viewing area of the display. The thumbnail image can have one or more indications of locations of discussion of concepts of interest based upon the concept or concepts selected by the user. Further, some embodiments will display the second indication juxtaposed to the first indication, enabling the user to visually compare the two indications.

In another aspect according to the present invention, a computer program product for providing an interest profile for an electronically stored document comprises a computer readable storage medium containing code for performing a variety of tasks. The product can comprise code for accepting user input indicating user-specified concepts of interest and code for analyzing the electronically stored document to identify locations of discussion of user-specified concepts of interest. The program product can also include code for displaying an indication of presence of discussion about concepts of interest within the electronically stored document. The indication can provide a reader an approximate position of discussion within the electronically stored document.

In another aspect according to the present invention, a system for providing an interest profile for an electronically stored document can include a memory, a display and a processor interconnected to the memory and the display by a bus. The processor can perform tasks such as accepting user input indicating user-specified concepts of interest and analyzing the electronically stored document to identify locations of discussion of the user-specified concept of interest. The processor can also display an indication of presence of discussion about the concepts of interest within the electronically stored document on the display. The indication can provide a reader an approximate position of the discussion within the electronically stored document.

Numerous benefits are achieved by way of the present invention over conventional techniques. The present invention can provide an interest profile of a document for the reader. In many embodiments, the interest profile can be easily personalized to the user. Some embodiments are easier to use than conventional browser user interfaces. Embodiments according to the invention can provide more information to the reader of a document than known techniques. Many embodiments according to the invention will enhance the user's reading or web browsing experience by providing indication of which portions of documents are likely to be of most interest to the reader. These and other benefits are described throughout the present specification.

A further understanding of the nature and advantages of the inventions herein may be realized by reference to the remaining portions of the specification and the attached drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

DESCRIPTION OF THE SPECIFIC EMBODIMENTS

The present invention provides interest profiles for electronic documents to enhance the experience of reading or using the document. In exemplary embodiments, methods and systems including a graphical presentation of an interest profile assist the user in browsing or searching documents. The graphical presentation can provide information about content of a document, for example. The invention can be embodied in computer systems that include user input devices, processors, displays, storage and the like.

Figure 1A:
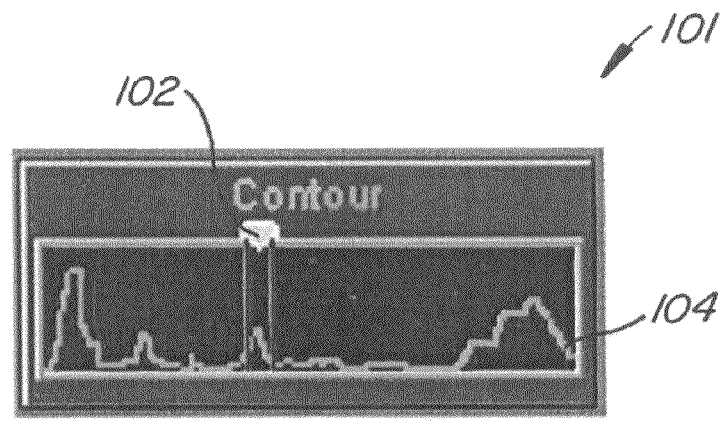
FIGS. 1A-1B illustrate document interest profiles in particular embodiments according to the present invention.

FIG. 1A is an illustration of a representative document interest profile image in a particular embodiment according to the present invention. This diagram is merely an example which should not limit the scope of the claims herein. One of ordinary skill in the art would recognize many other variations, alternatives, and modifications. FIG. 1A illustrates an annotation contour graphical presentation 101 of a document interest profile. Annotation contour 101 presents a profile view of a document based on a persistence measure of a concept within the document. A persistence measure can be a number of annotations ("hits") in the document, for example. Reference may be had to a commonly owned, co-pending U.S. patent application Ser. No. 08/995,616, entitled, "AUTOMATIC ADAPTIVE DOCUMENT HELP SYSTEM," incorporated herein by reference in its entirety for all purposes, for a detailed explanation of analyzing a document's content.

Annotation contour 101 can show the concentration, or persistence, of annotations throughout an entire document, or in portions of the document. Annotation contours can assist users viewing long documents. While annotation contour 101 comprises a line graph format, those of ordinary skill in the art can readily appreciate that other presentation formats, such as bar charts, scatter plots and the like can also be used without departing from the scope of the present invention. Annotation contour 101 comprises a page pointer 102 that can be dragged to a location on a graphical representation of the document contents 104 by the user using a pointing device, such as a mouse, for example. Responsive to the user's positioning the page pointer to a position in the graphical document representation, the display screen will reposition to display a corresponding location within the document. In this manner, the user can evaluate where the concentration of a concept of interest is within the document and move to this position within the document by sliding the page pointer to a corresponding location on the graphical representation of the document. In a presently preferable embodiment, the distance between the vertical lines of page pointer 102 is approximately 1 page length. However, other lengths can be used without departing from the scope of the present invention.

Figure 1B:
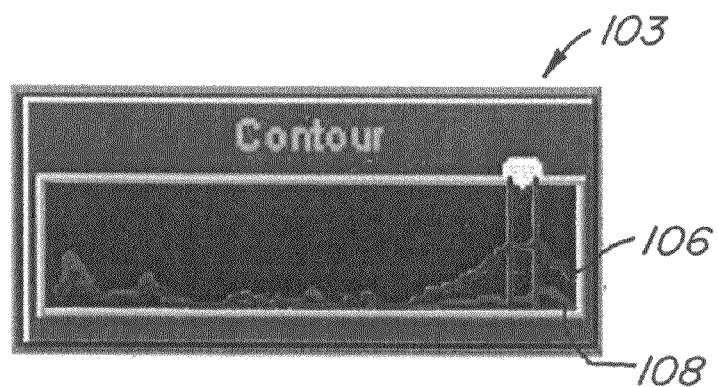

FIG. 1B is an illustration of another representative document interest profile image in a particular embodiment according to the present invention. This diagram is merely an example which should not limit the scope of the claims herein. One of ordinary skill in the art would recognize many other variations, alternatives, and modifications. FIG. 1B illustrates an annotation contour graphical presentation 103 of a document interest profile. Annotation contour 103 presents a profile view of a document based on a persistence measure of two concepts within the document. Annotation contour 103 comprises a graphical representation 106 corresponding to the persistence of a first concept of interest within the subject document, and a graphical representation 108 corresponding to the persistence of a second concept of interest within the subject document. While annotation contour 103 has been discussed with two concepts of interest, those of ordinary skill in the art can readily appreciate that the method is easily extendible to any number of concepts of interest without departing from the scope of the present invention.

In an alternative embodiment, a single contour can be used to indicate presence or persistence of multiple concepts of interest. In such an embodiment, the contour can display a result of a manipulation of constituent presence or persistence measurements. For example, information about the presence or persistence of two concepts of interest can be added, and a contour can be displayed showing the result of the addition. Other manipulations, such as subtraction of one interest profile from another, scaling by a scalar or functional factor, and the like are embodiments within the scope of the present invention.

Figure 2:
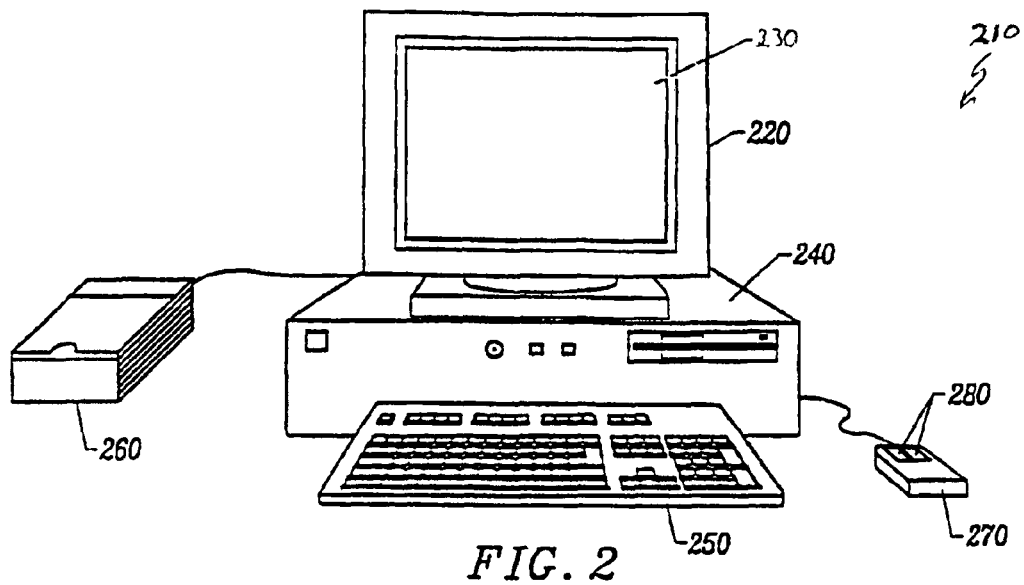
FIG. 2 is an illustration of a system in a particular embodiment according to the present invention.

FIG. 2 is an illustration of a representative system suitable for implementing the according to a particular embodiment of the present invention. This diagram is merely an example which should not limit the scope of the claims herein. One of ordinary skill in the art would recognize many other variations, alternatives, and modifications. FIG. 2 depicts but one example of many possible computer types or configurations capable of being used with the present invention. Embodiments according to the invention can be implemented in a single application program such as a browser, or may be implemented as multiple programs in a distributed computing environment, such as a workstation, personal computer or a remote terminal in a client server relationship. FIG. 2 shows computer system 210 including display device 220, display screen 230, cabinet 240, keyboard 250, scanner 260 and mouse 270. Mouse 270 and keyboard 250 are representative "user input devices." Other examples of user input devices are a touch screen, light pen, track ball, data glove and so forth. FIG. 2 is representative of but one type of system for embodying the present invention. It will be readily apparent to one of ordinary skill in the art that many system types and configurations are suitable for use in conjunction with the present invention.

In a preferred embodiment, computer system 210 includes a Pentium® class based computer, running Windows® NT operating system by Microsoft Corporation. However, the method is easily adapted to other operating systems and architectures without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

Figure 3:
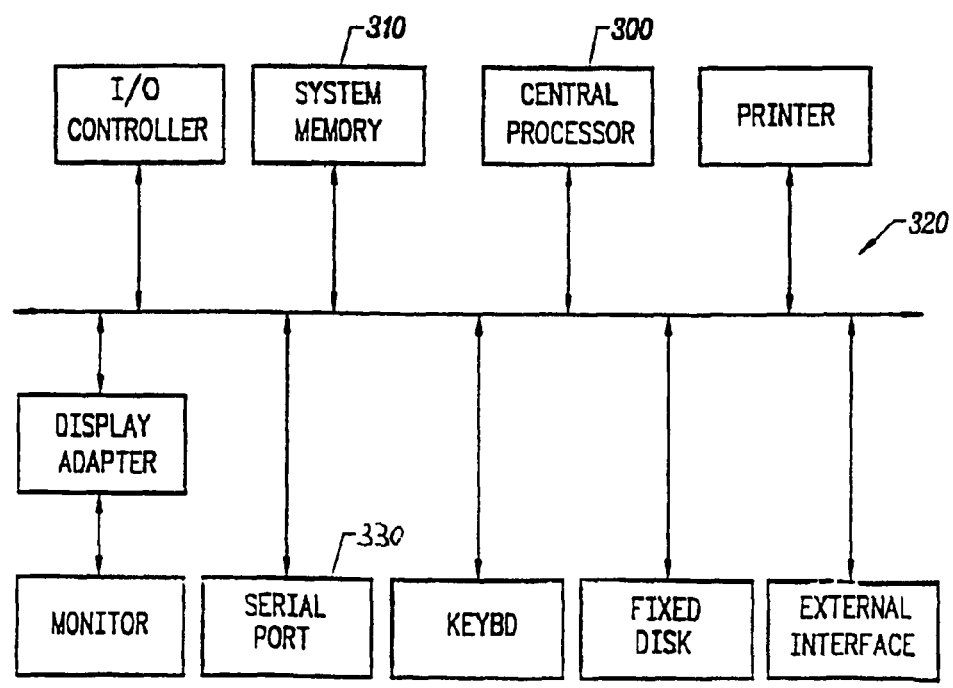
FIG. 3 is an illustration of basic subsystems of the system of FIG. 2.

FIG. 3 is an illustration of basic subsystems in computer system 210 of FIG. 2. In FIG. 3, subsystems are represented by blocks such as central processor 300, system memory 310, etc. This diagram is merely an example which should not limit the scope of the claims herein. One of ordinary skill in the art would recognize many other variations, alternatives, and modifications. The subsystems are interconnected via a system bus 320. Additional subsystems such as a printer, keyboard, fixed disk and others are shown. Peripherals and input/output (I/O) devices can be connected to the computer system by any number of means known in the art, such as serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, as well as the exchange of information between subsystems. Other arrangements of subsystems and interconnections are readily achievable by those of ordinary skill in the art. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 4:
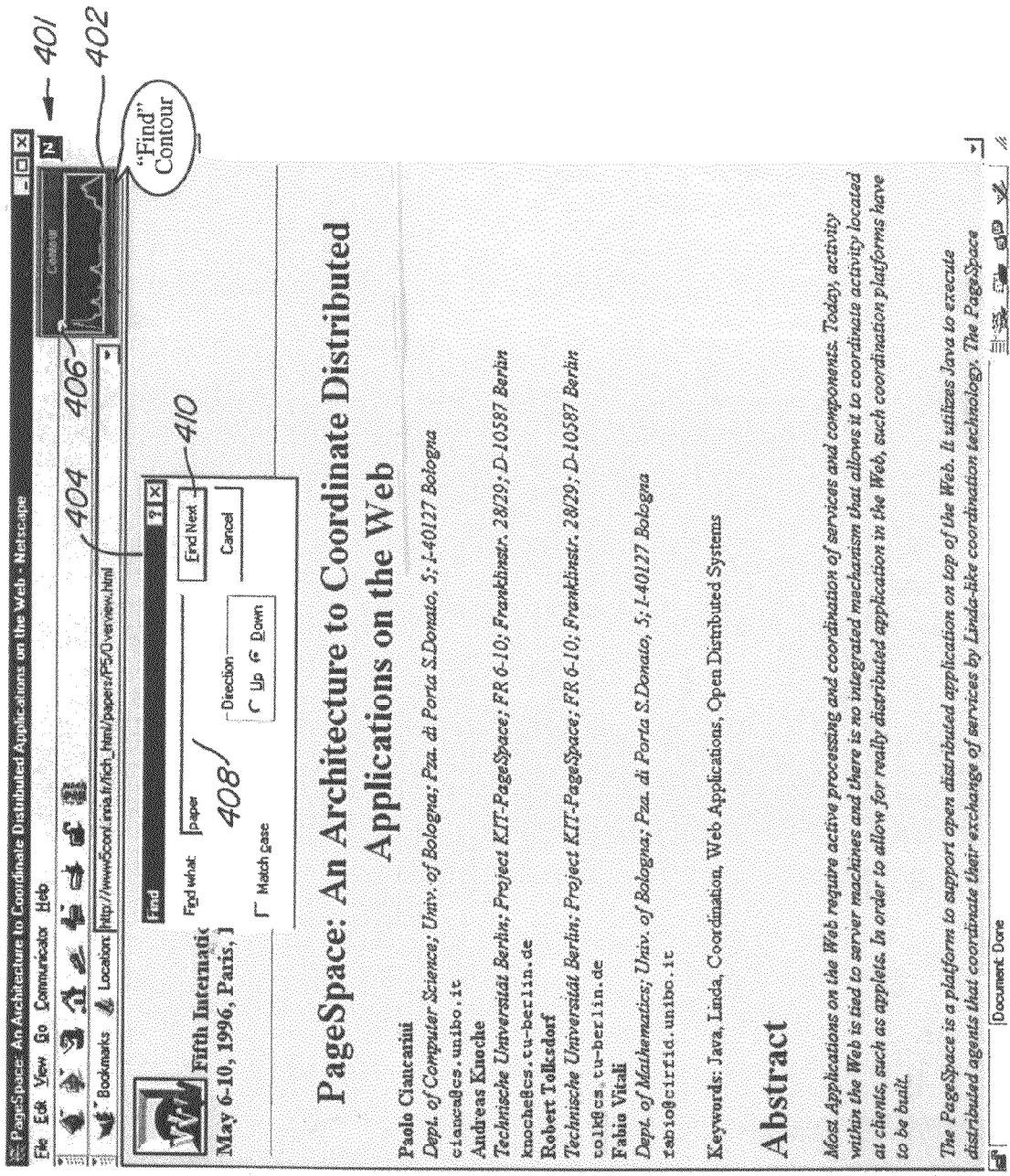
FIG. 4 illustrates a representative screen display in a particular embodiment according to the present invention.

FIG. 4 illustrates a representative browser user interface 401 having a document interest profile display 402 which can be displayed on display screen 230 of FIG. 2, in a particular embodiment according to the present invention. This diagram is merely an example which should not limit the scope of the claims herein. One of ordinary skill in the art would recognize many other variations, alternatives, and modifications. FIG. 4 illustrates an example use of an annotation contour 402 in conjunction with a find command box 404 for searching through the current document of interest, such as a page from the world wide web, for example, for information about one or more concepts of interest. As shown in FIG. 4, a user has entered a topic, "paper" in a field within the find command box 404. By clicking on the "find next" button, the user can move through the document from one instance of the word "paper" to the next. Additionally, annotation contour 402 indicates a persistence of the term "paper" within the document. A page pointer 406 at the top of annotation contour 402, can provide an indication of the relative position of the current page displayed to the user in the display window.

Figure 5:
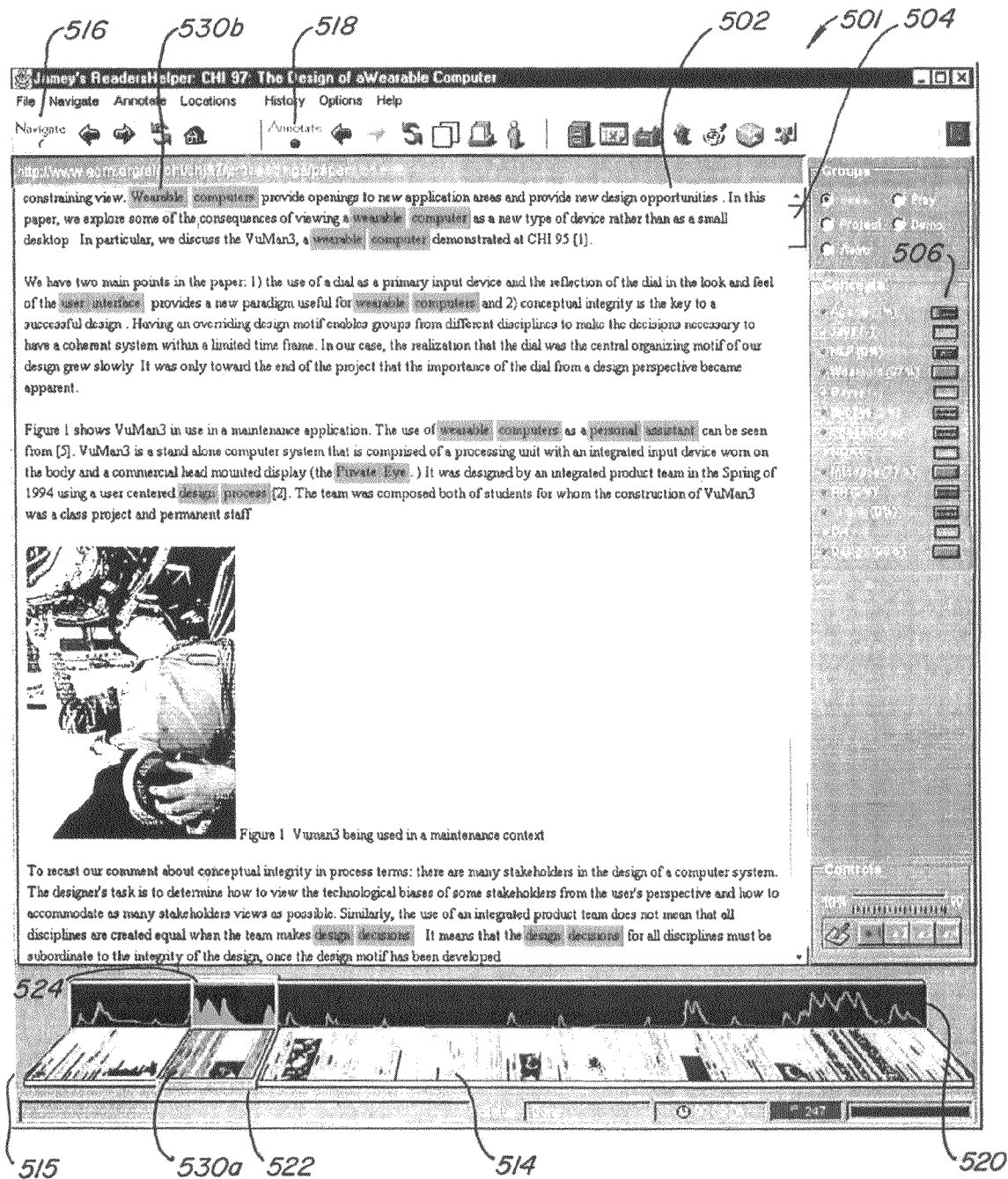
FIG. 5 illustrates a representative screen display in an alternative embodiment according to the present invention.

FIG. 5 illustrates another representative browser user interface having a document interest profile display 502 which can be displayed on display screen 230 of FIG. 2, in a particular embodiment according to the present invention. This diagram is merely an example which should not limit the scope of the claims herein. One of ordinary skill in the art would recognize many other variations, alternatives, and modifications. FIG. 5 illustrates a user interface 501 for viewing an annotated document online. Annotations can be added to a document in a variety of ways, such as described in a commonly owned copending U.S. patent application Ser. No. 08/995,616, entitled AUTOMATIC ADAPTIVE DOCUMENT HELP SYSTEM, which is incorporated herein by reference in its entirety for all purposes. A first viewing area 502 in user interface 501 shows a section of an electronic document. Using a scroll bar 504, or in other ways, the user may scroll the displayed section through the electronic document.

Some embodiments can include a series of concept indicators 506 that permit the user to identify which concepts of interest are to be noted in the document. A sensitivity control 508 permits the user to select the degree of sensitivity to apply in identifying potential locations of relevant discussion. At low sensitivity, more locations will be denoted as being relevant, even though some may not be of any actual interest. At high sensitivity, most all denoted locations will in fact be relevant but some other relevant locations may be missed. Many embodiments provide a percentage giving the relevance of the currently viewed document to the concept for each concept name appearing by one of selectable concept indicators 506. These relevance levels offer a quick assessment of the relevance of the document to the selected concepts.

In many embodiments, an elongated thumbnail image 514 representing the contents of the document is provided in a second viewing area 515. Thumbnail image 514 depicts a representation of the contents of the document, the current location of the reader, i.e., the location of the text displayed in section 502, using a sliding window 522, as well as annotations corresponding to locations of discussion of concepts of interest to the reader, such as annotation 530a that corresponds to annotation 530b in the document displayed in viewing area 502. An annotation contour 520 can be displayed along with elongated thumbnail image 514. Annotation contour 520 can provide an indication of the presence of one or more concepts of interest to the reader within the document. A second sliding window 524 provides a counter part to sliding window 522. Counterpart sliding window 524 can be positioned along the annotation contour 520, to enable the user to find discussions of the topics of interest within the document.

In some embodiments, one or more navigation tools can be found on a navigation toolbar 516. Miscellaneous annotation tools can be found on an annotation toolbar 518. The annotation tools on annotation toolbar 518 facilitate navigation through a collection of documents. Annotations may be added to the document text to denote relevance to user-selected concepts of interest.

Figure 6A:
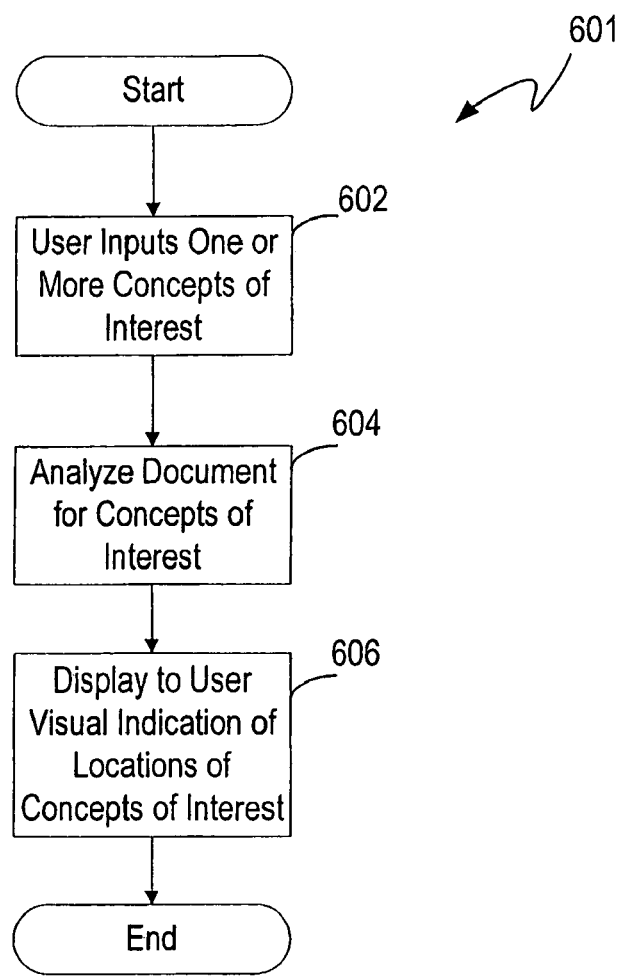
FIGS. 6A-6B illustrate simplified flowcharts of representative process steps in particular embodiments according to the present invention.

FIG. 6A illustrates a flowchart 601 of simplified process steps in a particular representative embodiment according to the invention for creating a document interest profile. This diagram is merely an example which should not limit the scope of the claims herein. One of ordinary skill in the art would recognize many other variations, alternatives, and modifications. The method is preferably embodied as software processes executing in a computer system that includes a user input device coupled to a processor, a display and a memory. In a step 602, user input indicating user-specified concepts of interest is accepted. Next, in a step 604, the electronic document is analyzed in order to identify locations of discussion of the concepts of interest to the user specified in step 602. Then, in a step 606, the electronic document is displayed, with an indication to the reader of the presence of the concepts of interest within the document. The indication can take the form of a contour graph that indicates the relative strength of the concept of interest at various points within the document. In some embodiments, a pointer associated with the graph can provide an indication to a reader of an approximate position of a currently displayed portion of the document, using a 'sliding window' style indication.

Figure 6B:
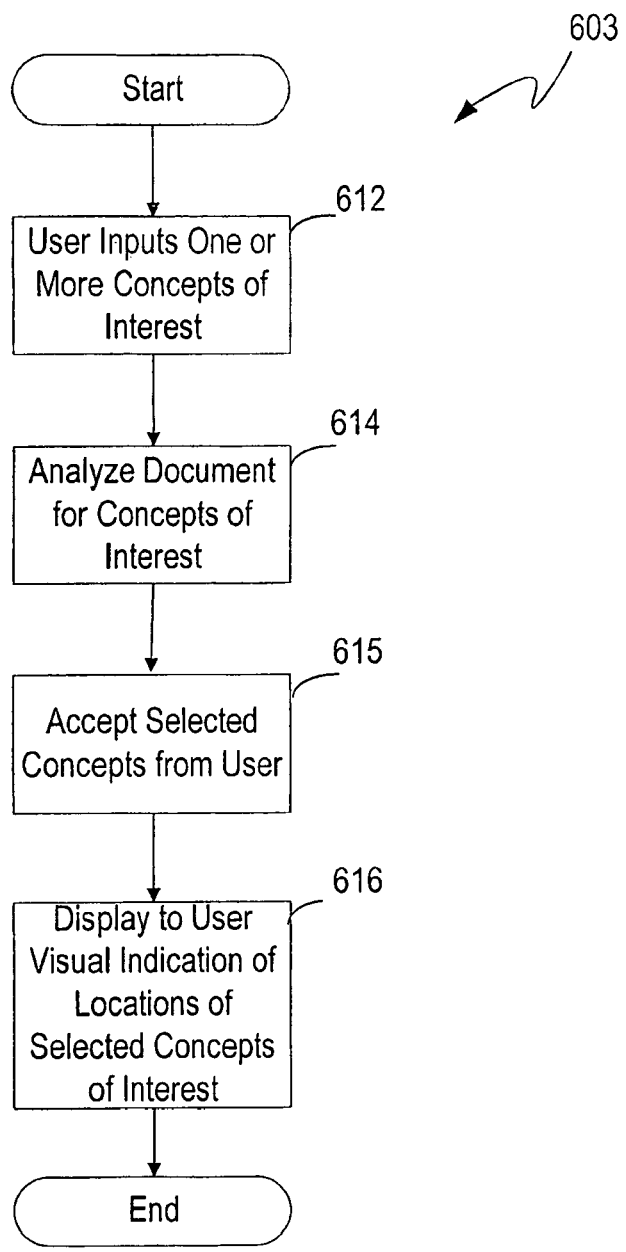

FIG. 6B illustrates a flowchart 603 of simplified process steps in another representative embodiment according to the invention for creating a document interest profile. This diagram is merely an example which should not limit the scope of the claims herein. One of ordinary skill in the art would recognize many other variations, alternatives, and modifications. FIG. 6B illustrates a step 612, wherein user input indicating user-specified concepts of interest is accepted. Next, in a step 614, the electronic document is analyzed in order to identify locations of discussion of the concepts of interest to the user specified in step 612. In a step 615, input from the user selecting one or more concepts of interest is accepted. Input can be received from the user clicking on icons with the mouse, or the like. Then, in a step 616, the electronic document is displayed, with an indication to the reader of the presence of the concepts of interest selected by the user in step 615. The indication can take the form of a contour graph that indicates the relative strength of the concept of interest at various points within the document. In some embodiments, a pointer associated with the graph can provide an indication to a reader of an approximate position of a currently displayed portion of the document, using a 'sliding window' style indication.

Some embodiments will also include a document thumbnail image to provide summary information, and the like.

FIGS. 7A-7D illustrate representative screens in examples of particular embodiments according to the present invention. In the examples of FIGS. 7A-7D, a user is using an exemplary embodiment to learn about wearable computers. Other references about these topics, as well as other topics can be viewed using various embodiments according to the present invention. Thus, the screens of FIGS. 7A-7D are intended to exemplary and not limiting.

Figure 7A:
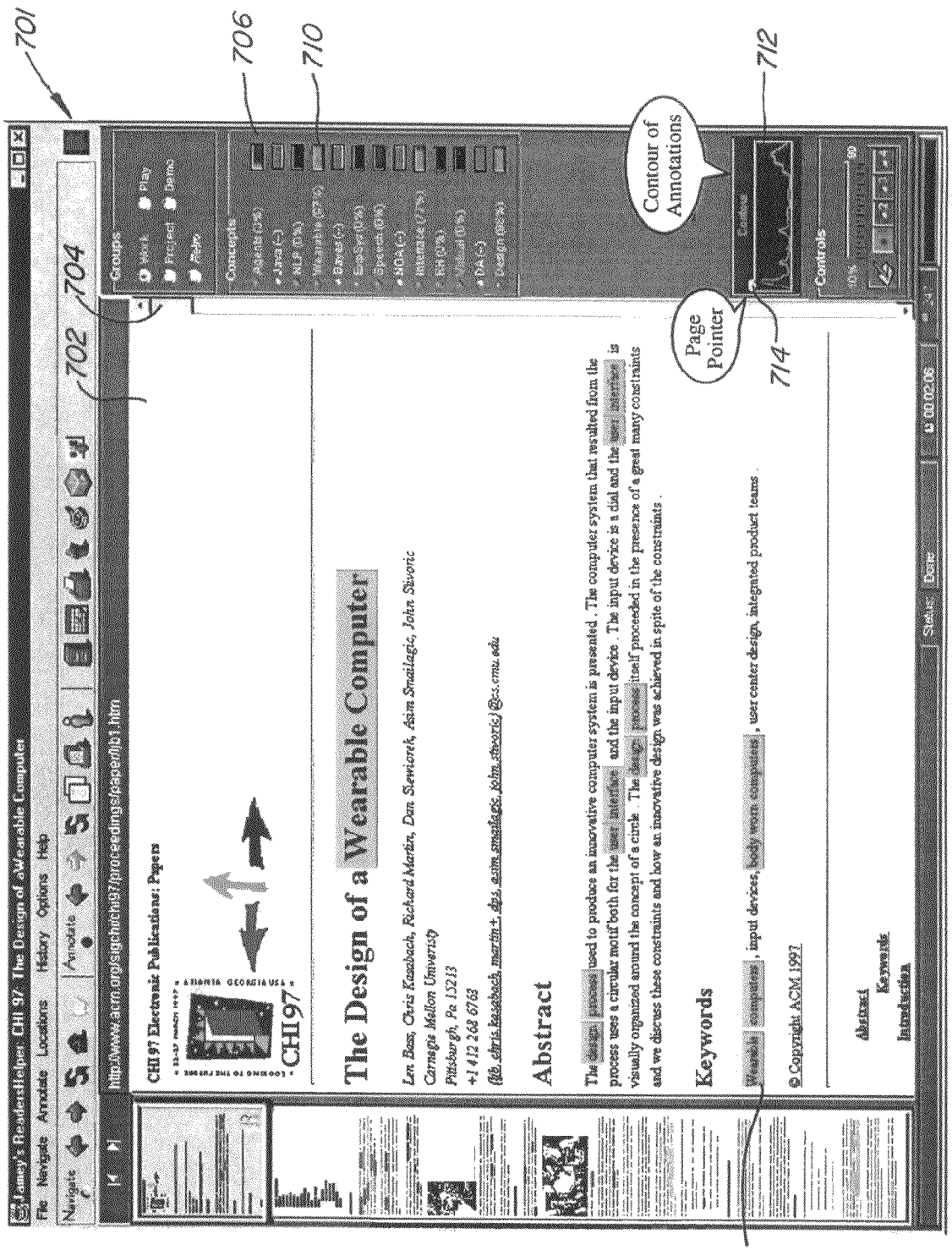
FIGS. 7A-7D illustrate a representative example of browsing documents in a particular embodiment according to the present invention.

FIG. 7A illustrates a representative screen in an example search or browsing of a web based document in a particular embodiment according to the present invention. This diagram is merely an example which should not limit the scope of the claims herein. One of ordinary skill in the art would recognize many other variations, alternatives, and modifications. FIG. 7A illustrates a browser user interface 701 for viewing an annotated document online. A first viewing area 702 in user interface 701 shows a section of an electronic document. A scroll bar 704 provides the user with the ability to scroll the displayed section through the electronic document. A plurality of selectable concept indicators 706 permit the user to identify which concepts of interest are to be noted in the document. A percentage gives the relevance of the currently viewed document to the concept for each concept name appearing by one of selectable concept indicators 706. These relevance levels offer a quick assessment of the relevance of the document to the selected concepts. An annotation 708 indicates the presence of the word "wearable" within the body of the document. "Wearable" is a concept of interest denoted by concept of interest indicator 710.

Annotation contour 712 provides an "activity indication" of the locations of the annotations, such as annotation 708, within the document. The graph of annotation contour 712 indicates a relative number of annotations throughout the document. Other types of indicators, such as bar graphs, scatter plots and the like can also be used to provide information about the location and number of annotations within the document in other embodiments according to the present invention. Page pointer 714 indicates the relative position of the currently displayed page of viewing area 702 within the document. The user can move page pointer 714 along annotation contour 712 in order to position the document in the first viewing area 702 to a portion of the document having a high concentration of instances of annotations.

Figure 7B:
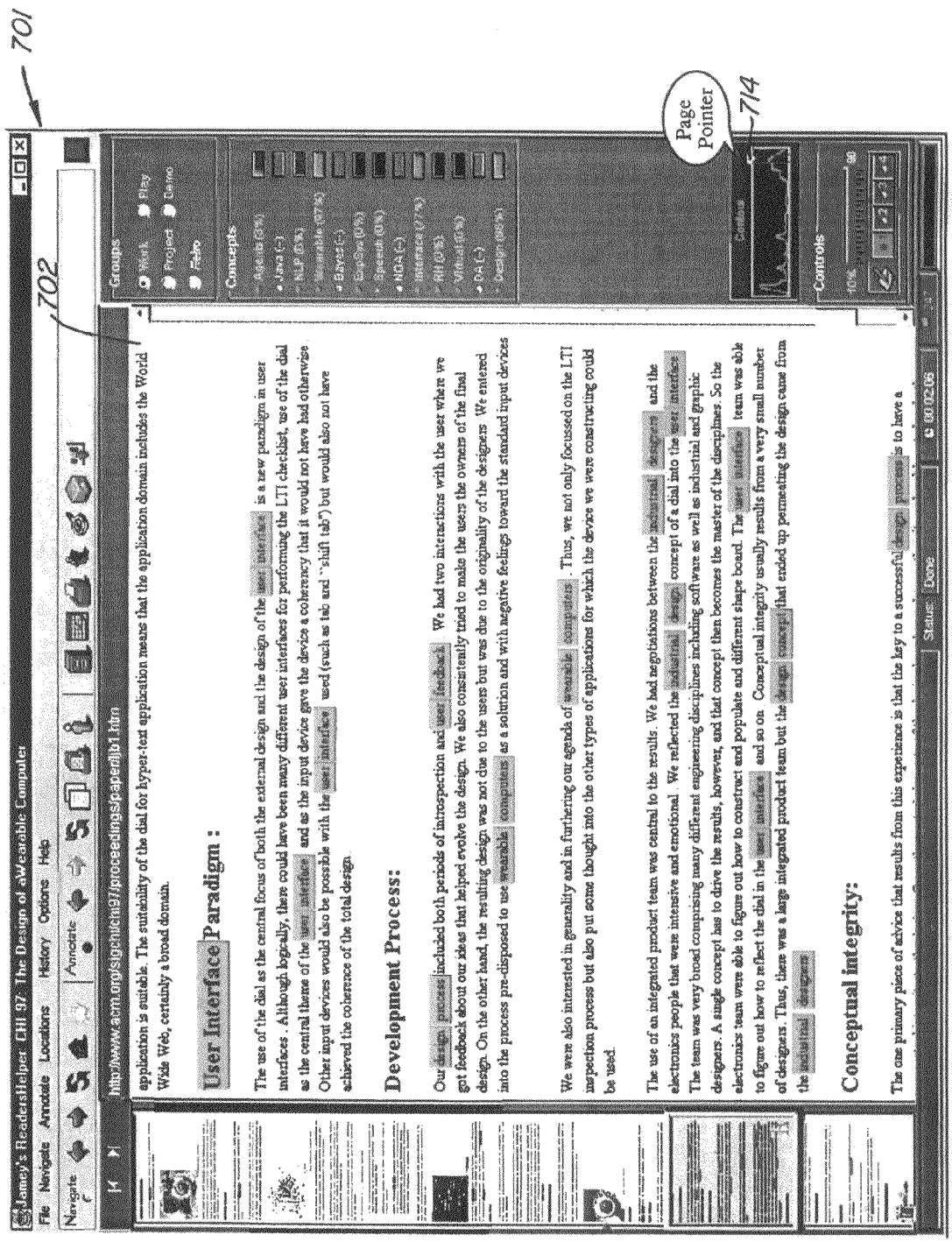

FIG. 7B illustrates another representative screen in the example search or browsing of a web based document in a particular embodiment according to the present invention. This diagram is merely an example which should not limit the scope of the claims herein. One of ordinary skill in the art would recognize many other variations, alternatives and modifications. FIG. 7B illustrates browser 701 wherein a user has repositioned page pointer 714 to a portion of the document having relatively many instances of annotations for a particular concept. Display viewing area 702 now depicts a portion of the document corresponding to the placement of the page pointer by the user. In this way, the user can quickly locate portions of a large document having material about concepts of interest to the user by sliding the page pointer to an apparent "hot spot" within the document.

Figure 7C:
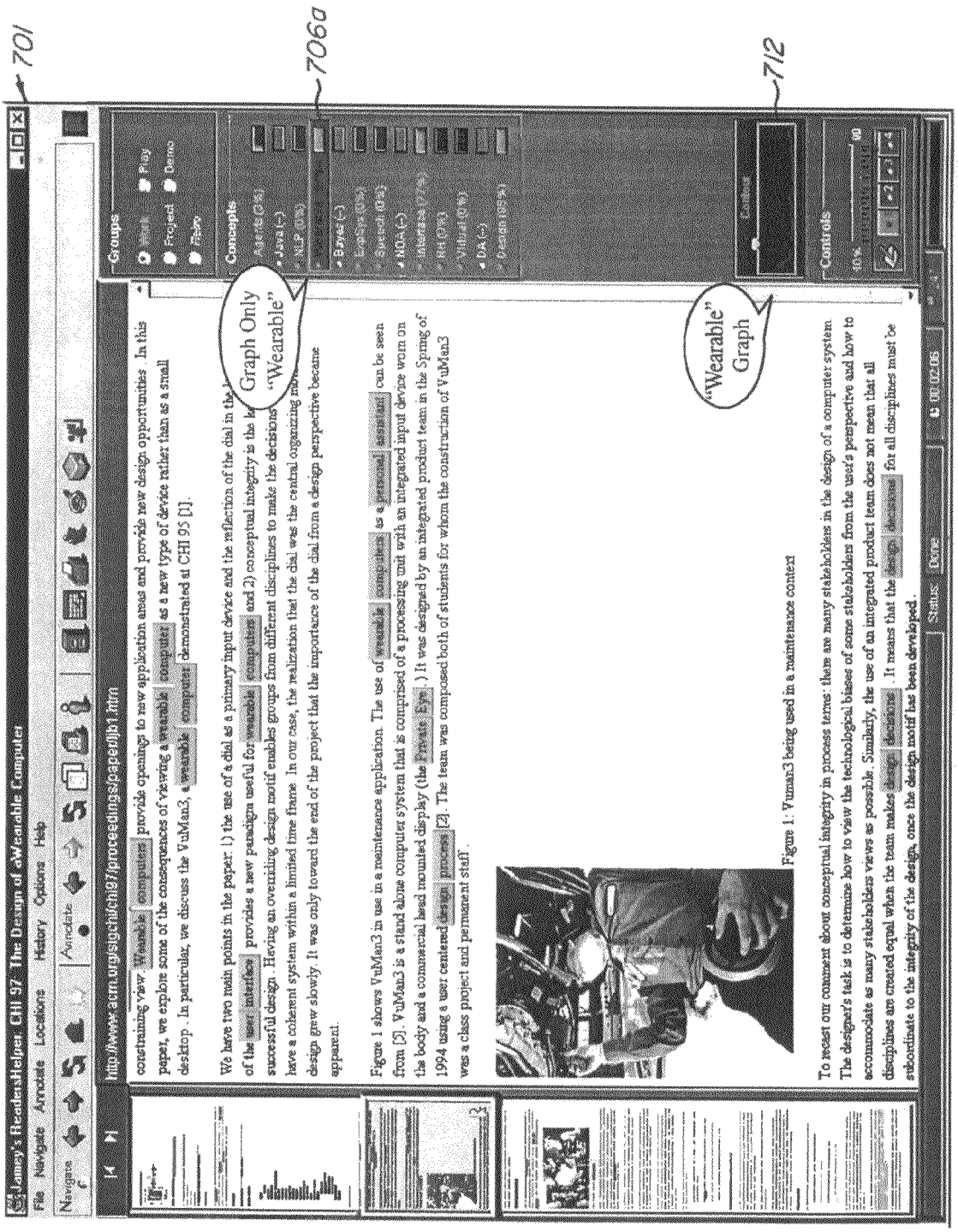

FIG. 7C illustrates a further representative screen in an example search or browsing of a web based document in a particular embodiment according to the present invention. This diagram is merely an example, which should not limit the scope of the claims herein. One of ordinary skill in the art would recognize many other variations, alternatives and modifications. FIG. 7C illustrates browser 701 wherein the user has selected an individual concept, "wearable" as being of interest. The user selects a concept indicator 706a corresponding to the concept "wearable" from among the selectable concept of interest indicators 706. Annotation contour 712 depicts the relative occurrence of the selected concept, "wearable" within the document.

Figure 7D:
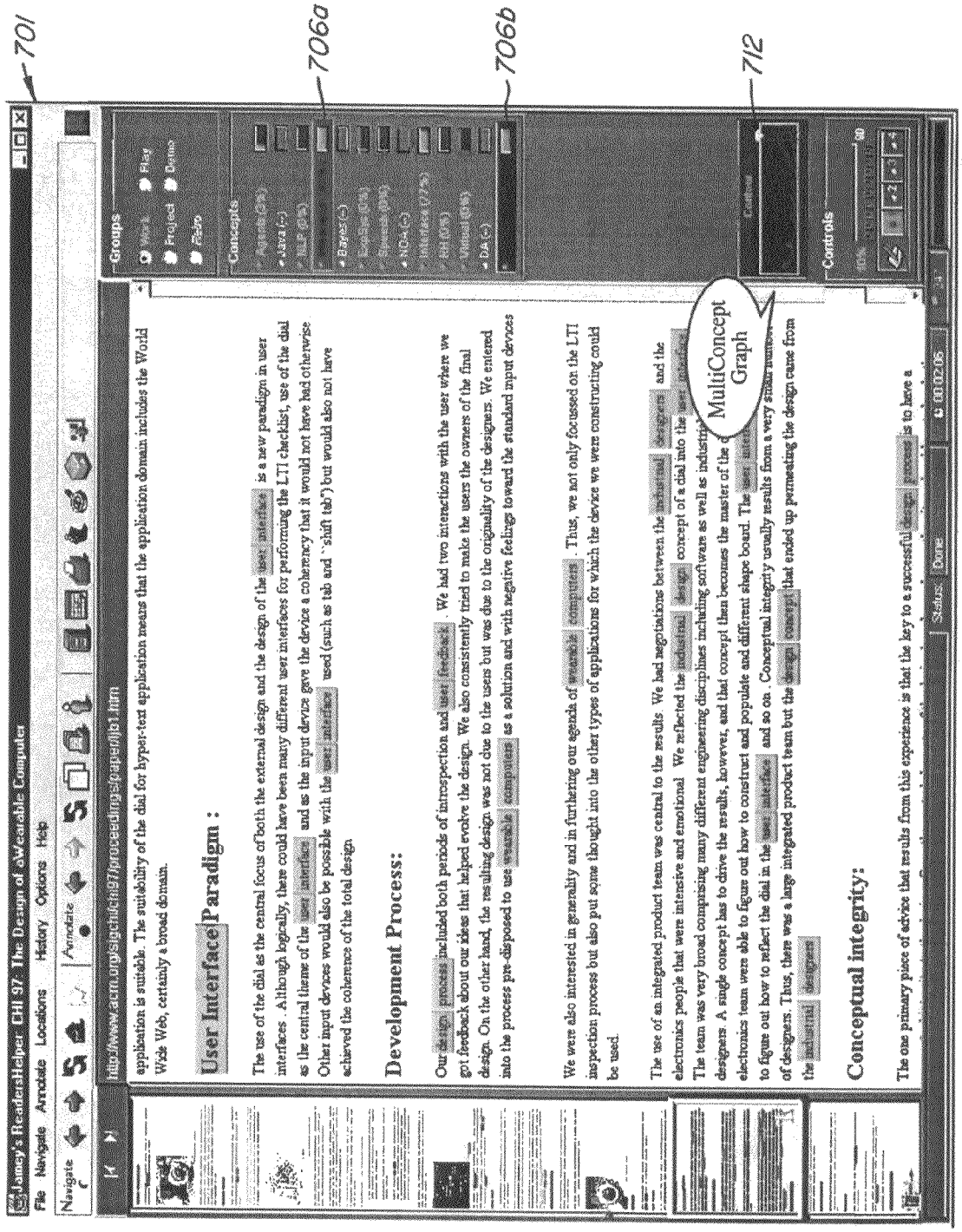

FIG. 7D illustrates a yet further representative screen in an example search or browsing of a web based document in a particular embodiment according to the present invention. This diagram is merely an example, which should not limit the scope of the claims herein. One of ordinary skill in the art would recognize many other variations, alternatives and modifications. FIG. 7D illustrates browser 701 wherein the user has selected two concepts, "wearable," and "design" as being of interest. The user selects a concept indicator 706*a* corresponding to the concept "wearable," and a concept indicator 706*b* corresponding to the concept "design" from among the selectable concept of interest indicators 706. Annotation contour 712 depicts the relative occurrence of the selected concept, "wearable" within the document.

In conclusion, the present invention provides for a method of providing an interest profile for documents. In the foregoing specification, the invention has been described with reference to a specific exemplary embodiments thereof. Many changes or modifications are readily envisioned. For example, changing the size or arrangement of the document interest profile image in the display, changing the appearance and features of document interest profile image by using different graphing methods and other types of depictions; adding audio effects; adding audio memos describing the contents of the document, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method comprising:
   performing, by a computer system, an automated keyword analysis of an electronic document to identify a set of keywords associated with the electronic document;
   displaying, by the computer system, the set of keywords;
   accepting, by the computer system, user input indicating user-specified concepts of interest, wherein the user input includes at least one keyword identified by the automated keyword analysis and at least one keyword not identified by the automated keyword analysis;
   analyzing, by the computer system, the electronic document to identify locations of discussion of the user-specified concepts of interest; and
   displaying, by the computer system, a graph representing the electronic document and illustrating persistence values associated with the user-specified concepts of interest at locations in the electronic document,
   wherein, for a given location in the electronic document, the graph illustrates a persistence value indicating a frequency of discussion of a user-specified concept of interest at that location relative to other locations in the electronic document.

2. The method of claim 1 wherein accepting user input further comprises:
   displaying an editable text input field; and
   receiving, via the editable text input field, text input indicating one or more keywords related to the user-specified concepts of interest.

3. The method of claim 1 wherein accepting user input further comprises:
   displaying a plurality of selectable concept indicators, the selectable concept indicators corresponding to the user-specified concepts of interest; and
   accepting a selection of a first selectable concept indicator from the plurality of selectable concept indicators, the first selectable concept indicator corresponding to a first user-specified concept of interest.

4. The method of claim 1 wherein the graph comprises a first axis representing locations within the electronic document and a second axis representing persistence values of a user-specified concept of interest.

5. A non-transitory computer readable medium having stored thereon program code executable by a computer system, the program code comprising:
   code for performing an automated keyword analysis of an electronic document to identify a set of keywords associated with the electronic document;
   code for displaying the set of keywords;
   code for accepting user input indicating user-specified concepts of interest, wherein the user input includes at least one keyword identified by the automated keyword analysis and at least one keyword not identified by the automated keyword analysis;
   code for analyzing the electronic document to identify locations of discussion of the user-specified concepts of interest; and
   code for displaying a graph representing the electronic document and illustrating persistence values associated with the user-specified concepts of interest at locations in the electronic document,
   wherein, for a given location in the electronic document, the graph illustrates a persistence value indicating a frequency of discussion of a user-specified concept of interest at that location relative to other locations in the electronic document.

6. The non-transitory computer readable medium of claim 5 wherein the code for accepting user input further comprises:
   code for displaying an editable text input field; and
   code for receiving, via the editable text input field, text input indicating one or more keywords related to the user-specified concepts of interest.

7. The non-transitory computer readable medium of claim 5 wherein the code for accepting user input further comprises:
   code for displaying a plurality of selectable concept indicators, the selectable concept indicators corresponding to the user-specified concepts of interest; and
   code for accepting selection of a first selectable concept indicator from the plurality of selectable concept indicators, the first selectable concept indicator corresponding to a first user-specified concept of interest.

8. The non-transitory computer readable medium of claim 5 wherein the graph comprises a first axis representing locations within the electronic document and a second axis representing persistence values of a user-specified concept of interest.

9. A system comprising:
   a memory;
   a display; and
   a processor interconnected to the memory and the display by a bus, the processor being configured to:
      perform an automated keyword analysis of an electronic document to identify a set of keywords associated with the electronic document;
      display the set of keywords;
      accept user input indicating user-specified concepts of interest, wherein the user input includes at least one keyword identified by the automated keyword analysis and at least one keyword not identified by the automated keyword analysis;

analyze the electronic document to identify locations of discussion of the user-specified concepts of interest; and display a graph representing the electronic document and illustrating persistence values associated with the user-specified concepts of interest at locations in the electronic document, wherein, for a given location in the electronic document, the graph illustrates a persistence value indicating a frequency of discussion of a user-specified concept of interest at that location relative to other locations in the electronic document.

10. The system of claim 9 wherein the processor is further configured to:

display an editable text input field; and receive, via the editable text input field, text input indicating one or more keywords related to the user-specified concepts of interest.

11. The system of claim 9 wherein the processor is further configured to:

display a plurality of selectable concept indicators, the selectable concept indicators corresponding to the user-specified concepts of interest; and accept a selection of a first selectable concept indicator from the plurality of selectable concept indicators, the first selectable concept indicator corresponding to a first user-specified concept of interest.

12. The system of claim 9 wherein the graph comprises a first axis representing locations within the electronic document and a second axis representing persistence values of a user-specified concept of interest.

* * * * *